(12) United States Patent
Bloemenkamp et al.

(10) Patent No.: US 8,776,878 B2
(45) Date of Patent: Jul. 15, 2014

(54) SENSOR FOR DETERMINING DOWNHOLE PARAMETERS AND METHODS FOR USING SAME

(75) Inventors: Richard Bloemenkamp, Montrouge (FR); Andrew Hayman, Voisins-le-Bretonneux (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 548 days.

(21) Appl. No.: 12/945,930

(22) Filed: Nov. 15, 2010

(65) Prior Publication Data

US 2011/0114309 A1    May 19, 2011

Related U.S. Application Data

(63) Continuation-in-part of application No. PCT/EP2009/007637, filed on Oct. 22, 2009.

(30) Foreign Application Priority Data

Oct. 31, 2008   (EP) .................................... 08168134

(51) Int. Cl.
*E21B 47/00* (2012.01)

(52) U.S. Cl.
USPC ...................... 166/250.01; 166/66; 73/152.55

(58) Field of Classification Search
USPC ............ 166/250.01, 66; 175/40, 50; 324/339, 324/340, 341, 342, 343; 73/152.55
See application file for complete search history.

(56) References Cited

U.S. PATENT DOCUMENTS

| | | | |
|---|---|---|---|
| 2,749,503 | A | 6/1956 | Doll |
| 3,793,181 | A | 2/1974 | Tintori |
| 3,816,811 | A | 6/1974 | Cmelik |
| 3,879,644 | A | 4/1975 | Maltby |
| 4,468,623 | A | 8/1984 | Gianzero et al. |

(Continued)

FOREIGN PATENT DOCUMENTS

| | | |
|---|---|---|
| EP | 1947479 | 7/2008 |
| EP | 1947480 | 7/2008 |

(Continued)

OTHER PUBLICATIONS

Murphy D P: "Advances in MWD and Formation Evaluation for 2001 Developments Include New Wireline, MWD, Mud Logging and Testing Tools"World Oil, Gulf Publishing Company, Houston, TX, US, vol. 222, No. 5, May 1, 2001, pp. 64-68, XPOOI048326.

(Continued)

*Primary Examiner* — Blake Michener
(74) *Attorney, Agent, or Firm* — Stephanie Chi; Jody DeStefanis

(57) ABSTRACT

A system and method for determining a downhole parameter includes a downhole tool having a sensor. The sensor includes a pad having insulation, and return(s) positionable in the insulation. The return(s) are adapted to exchange a current with a power source, and a portion of the return(s) may be in a fluid zone. The sensor includes a mud button positionable within the fluid zone and in the insulation a distance from the return(s). The mud button are suitable for exchanging current with the return(s). The mud button and the fluid zone are positioned a distance from the formation such that a majority of the current passing between the return(s) and the mud button passes through the downhole fluid. The current exchanged with the mud button generates a measurement of the downhole fluid.

3 Claims, 9 Drawing Sheets

(56) References Cited

U.S. PATENT DOCUMENTS

| | | | |
|---|---|---|---|
| 4,567,759 A | 2/1986 | Ekstrom et al. | |
| 4,600,887 A | 7/1986 | Baldwin et al. | |
| 4,608,983 A | 9/1986 | Muller et al. | |
| 4,614,250 A | 9/1986 | Panetta et al. | |
| 5,457,396 A | 10/1995 | Mori et al. | |
| 5,574,371 A | 11/1996 | Tabanou et al. | |
| 5,677,631 A | 10/1997 | Reittinger et al. | |
| 6,191,588 B1* | 2/2001 | Chen | 324/367 |
| 6,348,796 B2 | 2/2002 | Evans et al. | |
| 6,527,923 B2 | 3/2003 | Kirk et al. | |
| 6,600,321 B2 | 7/2003 | Evans | |
| 6,630,831 B2* | 10/2003 | Amini | 324/339 |
| 6,714,014 B2 | 3/2004 | Evans et al. | |
| 6,801,039 B2 | 10/2004 | Fabris et al. | |
| 6,809,521 B2 | 10/2004 | Tabarovsky et al. | |
| 6,850,068 B2 | 2/2005 | Chemali et al. | |
| 7,066,282 B2 | 6/2006 | Chen et al. | |
| 7,073,609 B2* | 7/2006 | Tabanou et al. | 175/50 |
| 7,258,005 B2 | 8/2007 | Nyce | |
| 7,394,258 B2 | 7/2008 | Itskovich et al. | |
| 7,397,250 B2 | 7/2008 | Bespalov et al. | |
| 7,689,363 B2 | 3/2010 | Itskovich et al. | |
| 7,782,060 B2* | 8/2010 | Clark et al. | 324/369 |
| 8,022,983 B2* | 9/2011 | Clark et al. | 348/85 |
| 8,232,803 B2 | 7/2012 | Bloemenkamp | |
| 8,330,466 B2 | 12/2012 | Bloemenkamp | |
| 2002/0134587 A1* | 9/2002 | Rester et al. | 175/48 |
| 2003/0164705 A1* | 9/2003 | Cheung et al. | 324/374 |
| 2003/0210061 A1 | 11/2003 | Fabris et al. | |
| 2005/0001624 A1 | 1/2005 | Ritter et al. | |
| 2005/0006090 A1* | 1/2005 | Chemali et al. | 166/250.01 |
| 2005/0067190 A1 | 3/2005 | Tabanou et al. | 175/50 |
| 2005/0212520 A1* | 9/2005 | Homan et al. | 324/338 |
| 2006/0066313 A1 | 3/2006 | Homan et al. | |
| 2006/0267591 A1* | 11/2006 | Hayman | 324/367 |
| 2007/0007967 A1 | 1/2007 | Itskovich et al. | |
| 2007/0029083 A1* | 2/2007 | Folberth | 166/254.2 |
| 2007/0035305 A1 | 2/2007 | Itskovich et al. | |
| 2007/0046290 A1 | 3/2007 | Bespalov et al. | |
| 2007/0103162 A1 | 5/2007 | Morys et al. | |
| 2008/0288171 A1 | 11/2008 | Itskovich et al. | |
| 2009/0072833 A1 | 3/2009 | Tabarovsky | |
| 2009/0090176 A1 | 4/2009 | Toribio et al. | |
| 2009/0153155 A1 | 6/2009 | Chambon et al. | |
| 2009/0204346 A1 | 8/2009 | Xie | |
| 2009/0302854 A1 | 12/2009 | Forgang et al. | |
| 2009/0306896 A1 | 12/2009 | Forgang et al. | |
| 2009/0322337 A1 | 12/2009 | Zhao et al. | |
| 2010/0039115 A1 | 2/2010 | Bespalov et al. | |
| 2011/0156710 A1* | 6/2011 | Wang | 324/366 |
| 2011/0199089 A1* | 8/2011 | Hayman | 324/347 |
| 2011/0199090 A1* | 8/2011 | Hayman | 324/356 |
| 2011/0241689 A1* | 10/2011 | Hayman | 324/355 |
| 2011/0241690 A1* | 10/2011 | Hayman | 324/355 |

FOREIGN PATENT DOCUMENTS

| | | |
|---|---|---|
| EP | 2182392 | 5/2010 |
| EP | 2362210 | 8/2011 |
| EP | 2385366 | 11/2011 |
| EP | 2182391 | 2/2012 |
| WO | 2009/126150 | 10/2009 |

OTHER PUBLICATIONS

S. Bonner, et al., "A New Generation of Electrode Resistivity Measurements for Formation Evaluation While Drilling," SPWLA 35th Annual Logging Symposium, Jun. 19-22, 1994.

R. N. Ritter, et al. "High Resolution Visualization of Near Wellbore Geology using While-Drilling Electrical Images," Petrophysics, 2005, vol. 46, No. 2, pp. 85-95.

R.A. Meador, "Dielectric Constant Logging, A Salinity Independent Estimation of Formation Water Volume," SPE 5504 published in 1975.

P.F. Rodney, et al., "Electromagnetic Wave Resistivity MWD Tool," SPE Drilling Engineering, Oct. 1986 SPE 12167.

J. Ph. Poley et al., "Use of V.H.F. Dielectric Measurements for Borehole Formation Analysis," published in 1978, The Log Analyst, vol. XIX, No. 3, pp. 8-30.

* cited by examiner

SENSOR FOR DETERMINING DOWNHOLE PARAMETERS AND METHODS FOR USING SAME

CROSS-REFERENCE TO RELATED APPLICATION

This invention and application is related to and is a continuation-in-part of International Patent Application No. PCT/EP2009/007637, entitled "A TOOL FOR IMAGING A DOWNHOLE ENVIRONMENT," filed on 22 Oct. 2009, which in turn claims the benefit of priority from European Patent Application No. 08168134, entitled "A TOOL FOR IMAGING A DOWNHOLE ENVIRONMENT," filed on 31 Oct. 2008. The entire contents of all of the aforementioned applications are hereby incorporated by reference herein.

TECHNICAL FIELD

The present invention relates to techniques for performing wellbore operations. More particularly, the present invention relates to techniques for determining characteristics of downhole fluids, such as electrical parameters of downhole fluids and/or formations.

BACKGROUND

Oil rigs are positioned at wellsites for performing a variety of oilfield operations, such as drilling a wellbore, performing downhole testing and producing located hydrocarbons. Downhole drilling tools are advanced into the earth from a surface rig to form a wellbore. Drilling muds are often pumped into the wellbore as the drilling tool advances into the earth. The drilling muds may be used, for example, to remove cuttings, to cool a drill bit at the end of the drilling tool and/or to provide a protective lining along a wall of the wellbore. During or after drilling, casing is typically cemented into place to line at least a portion of the wellbore. Once the wellbore is formed, production tools may be positioned about the wellbore to draw fluids to the surface.

During drilling, measurements are often taken to determine downhole conditions. In some cases, the drilling tool may be removed so that a wireline testing tool may be lowered into the wellbore to take additional measurements and/or to sample downhole fluids. Once the drilling operation is complete, production equipment may be lowered into the wellbore to assist in drawing the hydrocarbons from a subsurface reservoir to the surface.

The downhole measurements taken by the drilling, testing, production and/or other wellsite tools may be used to determine downhole conditions and/or to assist in locating subsurface reservoirs containing valuable hydrocarbons. Such wellsite tools may be used to measure downhole parameters, such as temperature, pressure, viscosity, resistivity, etc. Such measurements may be useful in directing the oilfield operations and/or for analyzing downhole conditions.

Attempts have been made to measure certain characteristics of a wellbore. Various techniques have been developed for measuring downhole parameters as described, for example, in US Patent/Application Nos. 20090204346, 20090153155, 20090072833, 20090090176, 20080288171, U.S. Pat. Nos. 7,258,005, 5,457,396, 6,527,923, 7,066,282, 6,801,039, 5,677,631, 5,574,371, 6,801,039, 3,879,644, 3,816,811, 4,608,983, 7,397,250, and 7,394,258. In particular U.S. Pat. No. 7,689,363 discloses a dual standoff resistivity imaging instrument.

More specifically, European Patent Application Nos. 102900084.2 and 10290083.4, filed by Applicant and incorporated herein by reference, relate to techniques for determining electrical parameters of downhole fluids.

In addition, International Patent Application No. PCT/EP2009/007637, filed by Applicant and incorporated herein by reference, relates to a tool and method for imaging a formation through a substantially non-conductive medium. The tool comprises first circuitry for injecting a current into the formation, wherein a complex impedance to the current is measured. Second circuitry for determining a phase angle of an impedance of the nonconductive medium and third circuitry for determining a component of the complex impedance that is orthogonal to the phase angle.

Despite the development of techniques for measuring downhole parameters, there remains a need to provide advanced techniques for determining parameters of downhole formations and/or wellbore fluids. It may be desirable to provide techniques that enhance downhole fluid and/or downhole formation measurements. It may be further desirable to provide techniques that isolate the measurements of certain downhole parameters, such as wellbore fluid data. Such isolated measurements are preferably capable of eliminating interference from other measurements. Preferably, such techniques involve one or more of the following, among others: accuracy of measurements, optimized measurement processes, reduced clogging, minimized components, reduced size, increased surface area for measurement, constant flow of fluids during measurement, optimized shape of measurement apparatus/system, real time capabilities, compatibility with existing wellsite equipment, operability in downhole conditions (e.g., at high temperatures and/or pressures), etc.

DISCLOSURE OF THE INVENTION

The present invention relates to a system and method for determining at least one downhole parameter of a wellsite using a sensor. The sensor positionable on a downhole tool deployable into a borehole of a downhole formation of the wellsite, the borehole having a downhole fluid therein. The sensor has insulation positionable on a pad of the downhole tool and at least one return positionable in the insulation. The at least one return is adapted to exchange a current with a power source. The at least one return defines a fluid zone. The sensor has a mud button positionable within the fluid zone and in the insulation a distance from the at least one return. The mud button exchanges current with the at least one return. The sensor has at least one guard for limiting at least a portion of the current flowing between the mud button and one of the at least one returns through the pad, each of the at least one guards may be positionable between the mud button and one of the at least one returns a distance therefrom. The mud button and the fluid zone are positioned a distance from the formation such that a majority of the current passing between the at least one return and the mud button passes through the downhole fluid whereby the current exchanged with the mud button generates a measurement of the downhole fluid.

The present invention relates to a system for determining at least one downhole parameter of a wellsite. The wellsite has a downhole formation with a borehole therethrough and a downhole fluid therein. The system has a downhole tool positionable in the borehole and a sensor positionable on the downhole tool. The sensor has insulation positionable on a pad of the downhole tool, at least one return positionable in the insulation, the at least one return adapted to exchange a current with a power source, the at least one return defining a fluid zone, and a mud button positionable within the fluid zone and in the insulation a distance from the at least one return, the mud button exchanging current with the at least one return. The sensor has at least one guard for limiting at least a portion of the current flowing between the mud button and one of the at least one returns through the pad, each of the at least one guards positionable between the mud button and one of the at least one returns a distance therefrom. The mud button and the fluid zone are positioned a distance from the formation such that a majority of the current passing between the at least one return and the mud button passes through the downhole fluid whereby the current exchanged with the mud button generates a measurement of the downhole fluid. The system may have a surface unit for controlling at least a portion of the downhole tool.

The present invention relates to a method for determining at least one downhole parameter of a wellsite, the wellsite having a downhole formation with a borehole therethrough and a downhole fluid therein. The method comprises providing a downhole tool having a sensor thereon. The sensor comprises insulation positionable on a pad of the downhole tool and at least one return positionable in the insulation, the at least one return adapted to exchange a current with a power source, the at least one return defining a fluid zone. The sensor comprises a mud button positionable within the fluid zone and in the insulation a distance from the at least one return, the mud button exchanging current with the at least one return. The sensor comprises at least one guard for limiting at least a portion of the current flowing between the mud button and one of the at least one returns through the pad, each of the at least one guards positionable between the mud button and one of the at least one returns a distance therefrom. The mud button and the fluid zone are positioned a distance from the formation such that a majority of the current passing between the at least one return and the mud button passes through the downhole fluid whereby the current exchanged with the mud button generates a measurement of the downhole fluid; positioning the downhole tool into the borehole. The method further comprises passing the current through the at least one return, the downhole fluid and the mud button, and determining at least one fluid parameter from the current.

BRIEF DESCRIPTION OF THE DRAWINGS

The present embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 6A shows a front view of the fluid sensor. FIG. 6B shows a cross-sectional side view of the fluid sensor.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details. Presently preferred embodiments of the invention are shown in the above-identified Figures and described in detail below.

Figure 1:
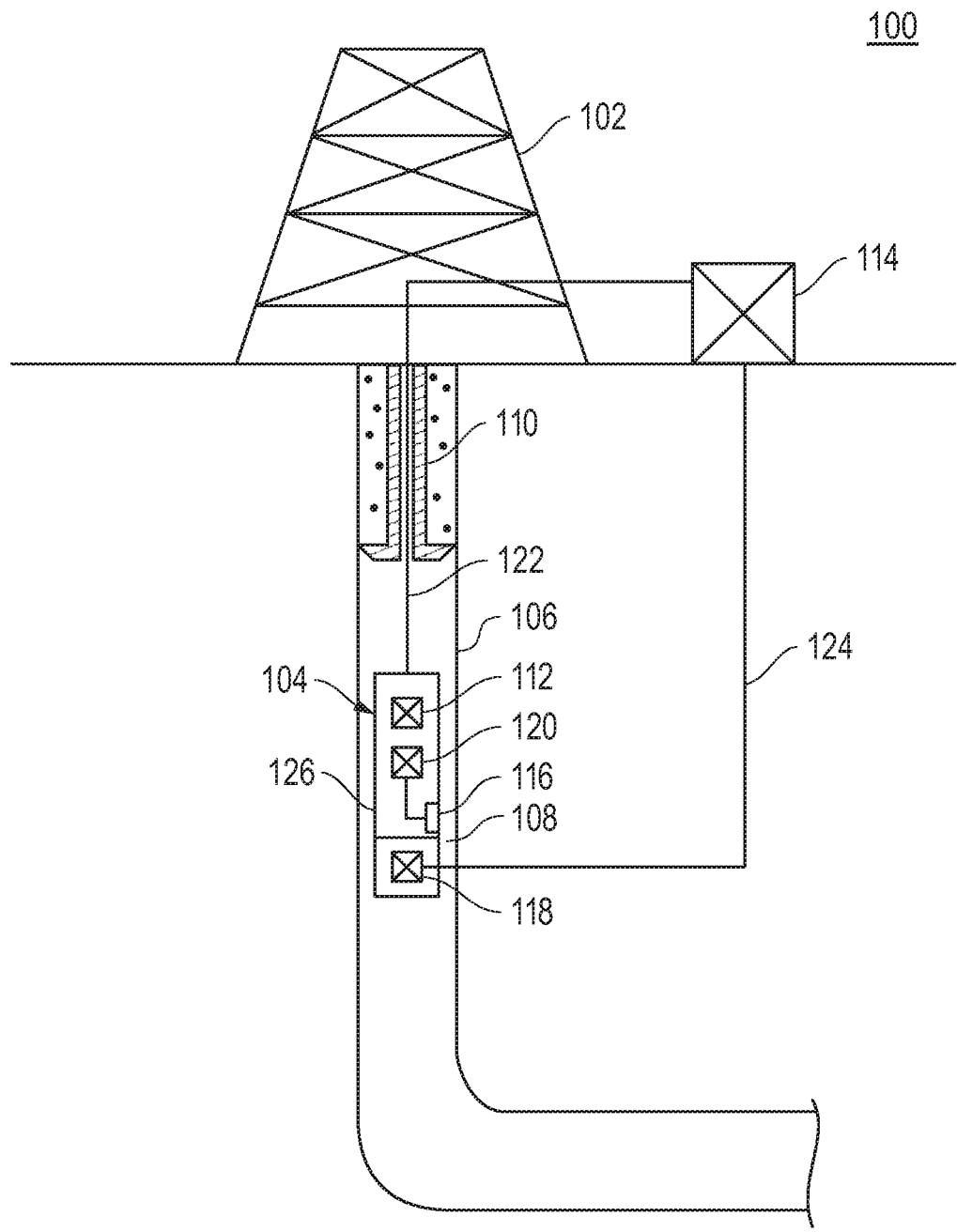
FIG. 1 is a schematic view of a system for determining downhole parameters comprising a downhole tool positioned in a wellbore and a sensor on the downhole tool for determining downhole parameters.

FIG. 1 is a schematic view of a wellsite 100 having an oil rig 102 with a downhole tool 104 suspended into a wellbore 106 therebelow. The wellbore 106 has been drilled by a drilling tool (not shown). A drilling mud, and/or a wellbore fluid 108, may have been pumped into the wellbore 106 and may line a wall thereof. As shown, a casing 110 has also been positioned in the wellbore 106 and cemented into place therein. The downhole tool 104 may include one or more sensors for determining one or more downhole parameters, such as wellbore fluid parameters and/or formation parameters. The wellbore fluid parameters, or properties, may be determined by the one or more sensors independent of a determination of the formation parameters. Thus, the determined fluid parameters may be used to more accurately determine the formation parameters as will be described in more detail below.

The downhole tool 104 is shown as a wireline logging tool lowered into the wellbore 106 to take various measurements. The downhole tool 104 may include a conventional logging device 112, a sensor 116, one or more telemetry devices 118, and an electronics package 120. The conventional logging device 112 may be provided with various sensors, measurement devices, communication devices, sampling devices and/or other devices for performing wellbore operations. For example, as the downhole tool 104 is lowered, it may use devices, such as resistivity or other logging devices, to measure formation parameters and/or properties.

As shown, the downhole tool 104 may be conveyed into the wellbore 106 on a wireline 122. Although the downhole tool 104 is shown as being conveyed into the wellbore 106 on a wireline 122, it should be appreciated that any suitable conveyance may be used, such as a slick line, a coiled tubing, a drill string, a casing string and the like. The downhole tool 104 may be operatively connected to a surface unit 114 for communication therebetween. The downhole tool 104 may be wired via the wireline 122, as shown, and/or wirelessly linked via the one or more telemetry devices 118. The one or more telemetry devices 118 may include any telemetry devices, such as electromagnetic devices, for passing signals to a surface unit 114 as indicated by communication links 124. Further, it should be appreciated that any communication device or system may be used to communicate between the downhole tool 104 and the surface unit 114. Signals may be passed between the downhole tool 104 and the surface unit 114 and/or other locations for communication therebetween.

While the downhole tool 104 is depicted as the wireline tool 104 having the sensor 116 thereon, it will be appreciated that the sensor 116 may be positioned downhole on a variety of one or more tools. For example, the sensor 116 may be placed downhole on a drilling, coiled tubing, drill stem tester, production, casing, pipe, or other downhole tool. Although only one sensor 116 is shown, it should be appreciated that one or more sensors 116 and/or portions of the sensors 116 may be located at several locations in the wellbore 106. The sensor 116 is preferably positioned about an outer surface of the downhole tool 104 so that the downhole fluid may pass therealong for measurement thereof. However, it will be appreciated that the one or more sensors 116 may be positioned at various locations about the wellsite 100 as desired for performing fluid measurement.

The electronics package 120 may include any components and/or devices suitable for operating, monitoring, powering, calculating, calibrating, and analyzing components of the downhole tool 104. Thus, the electronics package 120 may include a power source, a processor, a storage device, a signal conversion (digitizer, mixer, amplifier, etc.), a signal switching device (switch, multiplexer, etc.), a receiver device and/or a transmission device, and the like. The electronics package 120 may be operatively coupled to the sensor 116. The power source in the electronics package 120 may apply a voltage to the sensor 116. The power source may be provided by a battery power supply or other conventional means of providing power. In some cases, the power source may be an existing power source used in the downhole tool 104. The power source may be positioned, for example, in the downhole tool 104 and wired to the sensor 116 for providing power thereto as shown. Optionally, the power source may be provided for use with the sensor 116 and/or other downhole devices. Although the electronics package 120 is shown as one separate unit from the sensor 116, it should be appreciated that any portion of the electronics package 120 may be included within the sensor 116. Further, the components of the electronics package 120 may be located at various locations about the downhole tool 104, the surface unit 114 and/or the wellsite 100. The sensor 116 may also be wired or wirelessly connected to any of the features of the downhole tool 104, and/or surface unit 114, such as communication links, processors, power sources or other features thereof.

The sensor 116 may be capable of determining one or more downhole fluid parameters and/or one or more formation parameters. The downhole fluids may include any downhole fluids such as downhole mud (e.g., oil based), hydrocarbons, water and/or other downhole fluids. The sensor 116 may determine the downhole parameters of the downhole fluids and/or the downhole formations as the downhole tool 104 passes through the wellbore 106. Due to the harsh conditions of the downhole environment, the sensor 116 may be positioned on the downhole tool 104 in such a manner that the sensor 116 is capable of measuring fluids as the downhole tool 104 passes through the wellbore 106. Further, the sensor 116 may be positioned in such a manner that reduces clogging of downhole fluids as the downhole fluids pass the sensor 116. As shown, the sensor 116 is positioned on an outer surface 126 of the downhole tool 104. The sensor 116 may be recessed a distance below the outer surface 126 to provide additional protection thereto, or protruded a distance therefrom to access fluid and/or formation. The sensor 116 may also be positioned at various angles and locations as desired.

Figure 2A:
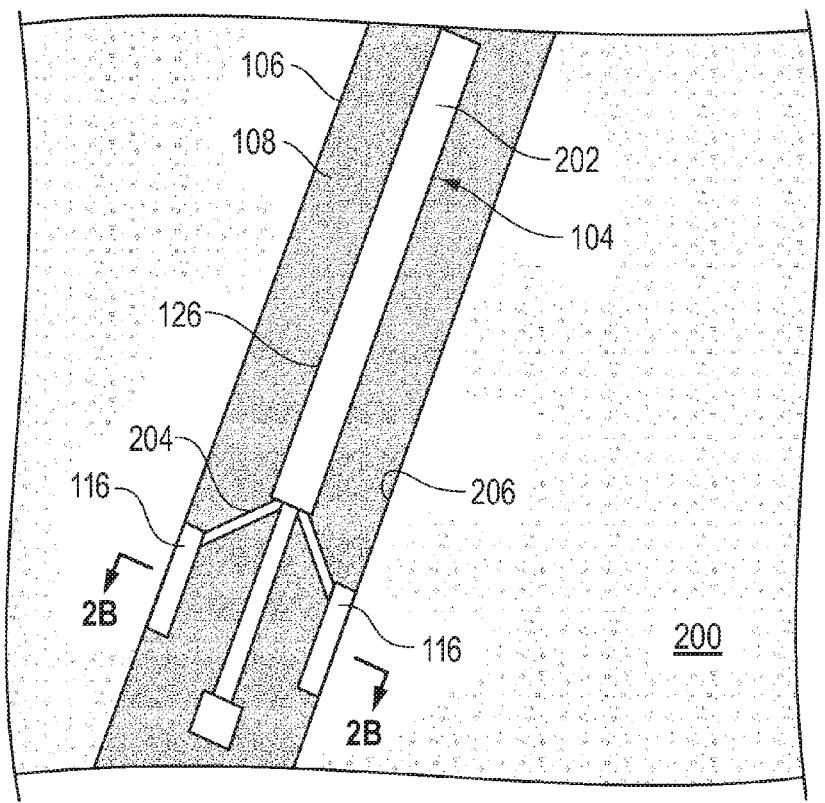
FIG. 2A is a schematic view of the downhole tool of FIG. 1 depicting the downhole tool with a pad with a sensor thereon.

FIG. 2A shows a schematic view of the downhole tool 104 located in the wellbore 106 and within a downhole formation 200. As depicted, the downhole tool 104 is a wireline microresistivity tool containing pads 207 with sensor 116. The sensors 116 may be located on the outer surface 126, or located on one or more arms 204 which extend from downhole tool 104. As shown, the sensor 116 is positioned on the pad 207. The arms may be configured to place the sensors 116 as close to the formation wall 206, or against a mud layer on the formation wall, as possible. Thus, the arms 204 may be actuatable, or spring loaded in order to bias the sensor 116 against the formation wall 206.

Figure 2B:
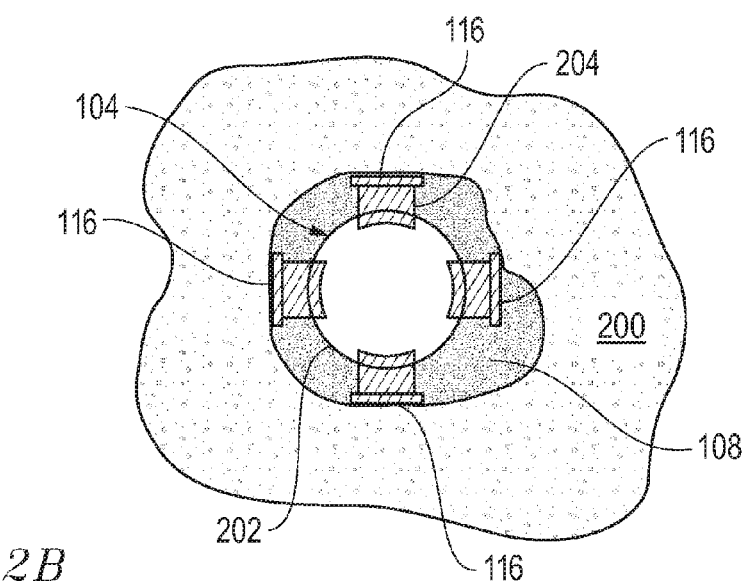
FIG. 2B is a horizontal cross-sectional view of a portion of the downhole tool of FIG. 2A taken along line 2B-2B.

FIG. 2B shows a horizontal cross-sectional view of the downhole tool 104 in FIG. 2A taken along line 2B-2B. As shown, the downhole tool 104 may include multiple sensors 116 located around a tool mandrel 202. Each of the sensors 116 may be configured to measure the parameters of the downhole fluid and/or parameters of the formation. The downhole fluid may be a conductive wellbore fluid such as a water based fluid, or a non-conductive wellbore fluid such as an oil based fluid. For the conductive wellbore fluid, the fluid in the wellbore typically has little effect on the formation parameters measured by the sensor 116, although the fluid that enters the rock pores or fractures does have an effect. For the non-conductive wellbore fluid, the fluid, and/or mud layer, may act as an insulator for the current entering the formation. Thus, when performing formation measurements in non-conductive wellbore fluid, the fluid may have an effect on the formation parameters measured by the sensor 116. Therefore, it may be necessary to correct the formation parameters using the wellbore fluid parameters measured by the sensor 116.

Figure 2C:
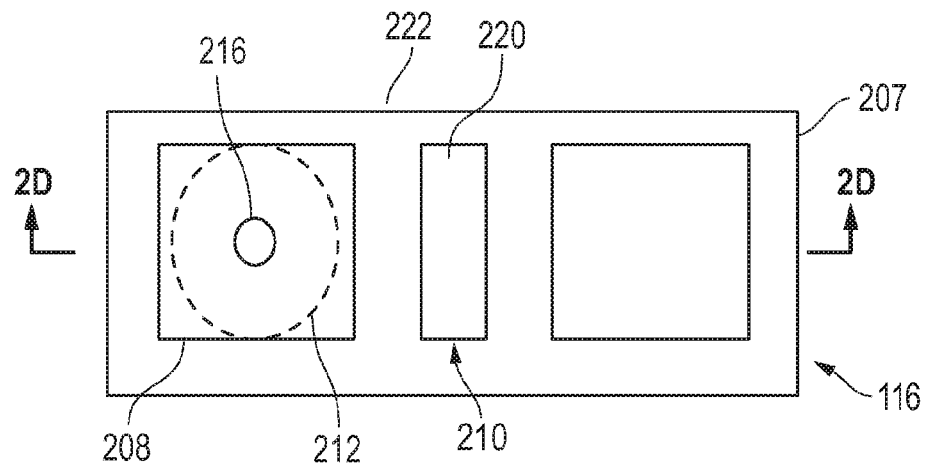
FIG. 2C is a front view of the pad of the downhole tool of FIG. 2A depicting the sensor in greater detail.

FIG. 2C shows a front face, or top view, of the sensor 116 positioned on the pad 207. The sensor 116 as shown may have an insulation material 222 with a fluid sensor 208 and a formation sensor 210 therein. Each of the fluid and formation sensors (208, 210) have source electrodes and sensor electrodes. The pad 207, or base, may adhere to the outer surface 126 of the downhole tool 104 using any conventional means.

Part or all of the pad 207, or base, may comprise the insulation material 222. The insulation material 222 may adhere to the pad 207 using any conventional means. The insulation is preferably a material, such as PEEK, capable of impeding and/or stopping current flow. Although described as PEEK, it should be appreciated that the insulating material 222 may be any suitable material for impeding or stopping current including, but not limited to, Sapphire, ceramics, polyimide resin, plastic, and the like. The insulation material 222 may be provided with a thin layer of copper thereon, and with a layer of gold applied to the copper to prevent oxidation (not shown).

Figure 2D:
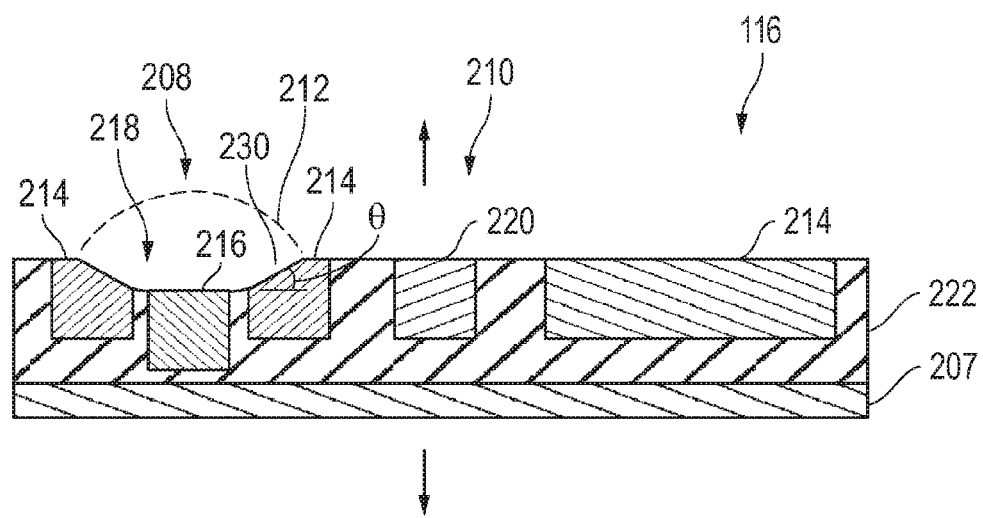
FIG. 2D is a longitudinal cross-sectional view of the pad of FIG. 2C taken along line 2D-2D depicting the sensor on a face of the pad with a recess.

The fluid sensor 208 may include a fluid zone 212. The fluid zone 212 may be an area configured to allow the fluid sensor 208 to measure the wellbore fluid parameters, as will be described in more detail below. For example, the fluid zone 212 may be created by a geometry, or a shape, of the fluid sensor 208 and/or a location of the fluid sensor 208. FIG. 2D shows a cross-sectional view of the sensor 116 taken along line 2D-2D. The fluid sensor 208 may be a circuit which may include one or more source electrodes 214 (or returns) and a mud button 216 (or sensor electrode).

The fluid zone 212 of the fluid sensor 208, as shown in FIG. 2D is a recess 218 in the pad 207. The fluid zone 212 may have any shape that allows flow of the wellbore fluid over the source electrodes 214 and the mud button 216. The fluid zone 212 may be on a nearly planar or slightly curved surface, thereby preventing fouling by viscous components of the fluid or trapping of solid components. The fluid zone 212 may be configured to locate the mud button 216 a sufficient distance from the formation wall 206 thereby allowing the mud button 216 to sense parameters of the wellbore fluid without interference from the formation. For example, if the mud button 216 is on the pad 207 at a location proximate to the formation wall 206, the mud button 216 may be placed in a very gradual and smooth recess as shown in FIG. 2D.

FIG. 2D shows the recess 218 formed by providing a slope 230 on at least a portion of the source electrodes 214 for the fluid sensor 208. The slope 230 may be a varying slope, for example of a continuously curved recess, or have a constant slope. In one example the slope 230 may have an angle Θ for optimizing fluid flow and current flow toward the mud button 216. In one example the angle Θ may be about 20 degrees. However, it should be appreciated that the angle Θ may be any suitable angle, for example in the range of 1 to 40 degrees.

The formation sensor 210 is a circuit which may include one or more source electrodes 214 (or returns), and a formation button 220 (or sensor electrode or injector). As shown in FIG. 2D, the fluid sensor 208 and the formation sensor 210 may share a common source electrode 214. However, it should be appreciated that there may be an additional source electrode (not shown) for the fluid sensor 208 and/or the formation sensor 210 in order to make the sensors 208 and 210 independent of one another. Between the source electrodes 214, the mud button 216, and the formation button 220 there is the insulating material 222. The fluid sensor 208 and the formation sensor 210 may be communicatively linked to the electronics package 120 (FIG. 1) as will be discussed in more detail below.

The fluid sensor 208 and the formation sensor 210 may be connected to the same electronics package 120, as shown in FIG. 1. Using the same electronics package 120 for both sensors may reduce the effect of electronics variations between the sensors 208 and 210. Further, it should be appreciated that the fluid sensor 208 and the formation sensor 210 may use separate electronics packages (not shown). The separate electronics packages may be similar and thereby may reduce the effect of electronics variations between the sensors. Further still, the separate electronics packages may have a wide variety of equipment.

The frequency range of the fluid sensor 208 and/or the formation sensor 210 may be optimized in a frequency range from almost DC up to roughly 100 Mhz. Due to the frequency, the fluid sensor 208 and the formation sensor 210 may be adapted to the full range of oil-based-mud micro-resistivity imaging tools such as OBMI as shown in U.S. Pat. No. 6,191,588 which is herein incorporated by reference in its entirety. Thus, the downhole tool 104 (as shown in FIG. 2A) may measure the fluid at the same, or similar, frequency or frequencies as the formation 200. Preferably, the frequency is optimized for measurement of one or more of the desired downhole parameters using one or more sensors positioned about the downhole tool.

The fluid sensor 208 and/or the formation sensor 210 may measure a voltage and a current between at least one of the source electrodes 214 and the mud button 216, and/or the formation button 220. From the voltage and the current electrical properties, or parameters, measured by the sensors, various downhole parameters of, for example, the wellbore fluid and/or the formation may be determined. The electrical properties may include conductivity and permittivity. Thus, the fluid sensor 208 and/or the formation sensor 210 may measure the amplitude and phase of the voltage and the current. From the amplitude and phase of the voltage and the current, the complex impedance may be calculated for the wellbore fluid and/or the formation. With the complex impedance known, the electrical properties may be calculated. In another example, the fluid sensor 208 and/or the formation sensor 210 measure only the amplitude of the voltage and the current. From amplitude of the voltage and the current, the impedance amplitude may be calculated. With the impedance amplitudes known electrical properties such as absolute conductivity and impedivity may be calculated. In another example, the fluid sensor 208 and/or the formation sensor 210 may measure only the phase of the voltage and the current. From phase of the voltage and the current, the impedance phase may be calculated. With the impedance phase known the ratio of conductivity and permittivity may be calculated. Measurements taken by the fluid sensor 208 and the formation sensor 210 may be taken at several frequencies (i.e. multi-frequency measurement) to optimize response.

The source electrodes 214, the mud button 216 and the formation button 220 may be any conventional electrode capable of generating current across a fluid. A power source (e.g., included in the electronics package 120 of FIG. 1) may be operatively connected to the electrodes for applying a voltage (V+, V−) thereacross. As voltage is applied, a current flows out of one of the electrodes, for example the source electrodes 214 that can be measured by the mud button 216 and/or the formation button 220. The source electrodes 214 and the sensor electrodes may be geometrically and materially optimized to match substantially to a fixed characteristic-impedance transmission line.

The current from the electrodes may be used to determine various parameters. In an example involving a fluid passing between a pair of electrodes, an AC voltage V is applied between two electrodes to generate a resultant current I that can be measured at the sensor electrode, for example the mud button or the formation button. The complex impedance Z may be determined from the measured current I based on the following:

$$Z = |Z| \exp(i\phi_Z) \qquad \text{Equation (1)}$$

where magnitude |Z| based on Ohms law and phase $\phi_Z$ are defined as follows:

$$|Z| = |V/I| \qquad \text{Equation (2)}$$

$$\phi_Z = \text{phase of } I \text{ relative } V \qquad \text{Equation (3)}$$

and where exp ($i\phi_Z$) based on Euler's formula is defined as follows:

$$\exp(i\phi_Z) = \cos \phi_Z + i \sin \phi_Z \qquad \text{Equation (4)}$$

The magnitude and phase of the impedivity (sometimes referred to as the complex impedivity) of a fluid ζ is defined as follows:

$$\zeta = |\zeta| \exp(i\phi_\zeta) \qquad \text{Equation (5)}$$

Equation (5) may be derived from Z by the relations as follows:

$$|\zeta| = k|Z| \qquad \text{Equation (6)}$$

Equation (6) may also be written as follows:

$$|\zeta| = k|V|/|I| \qquad \text{Equation (7)}$$

The phase (or dielectric angle) of the fluid ζ is derived as follows:

$$\phi_\zeta = \phi_Z \qquad \text{Equation (8)}$$

where:
 |ζ| is the magnitude of impedivity,
 $\phi_\zeta$ is the phase angle of the impedivity, and
 k is a constant for the device.

The constant k may be measured empirically, for example, by measuring the impedance V/I between electrodes as a fluid of known impedivity is passed therethrough. The constant k may also be calculated from the geometry of the electrodes using conventional methods.

Data concerning the measured current may be used to determine fluid parameters, such as impedivity, resistivity, impedance, conductivity, complex conductivity, complex permittivity, tangent delta, and combinations thereof, as well as other parameters of the wellbore fluid. The data may be analyzed to determine characteristics of the wellbore fluid, such as the type of fluid (e.g., hydrocarbon, mud, contaminants, etc.) A processor (e.g., located in the logging device 112, the electronics package 120 of FIG. 1) may be used to analyze the data. Optionally, the data may be communicated to the surface unit 114 and/or other location for storage and/or analysis. Such analysis may be performed with other inputs, such as historical or measured data about this or other wellsites. Reports and/or other outputs may be generated from the data. The data may be used to make decisions and/or adjust operations at the wellsite. In some cases, the data may be fed back to the wellsite for real-time decision making and/or operation.

Figure 3:
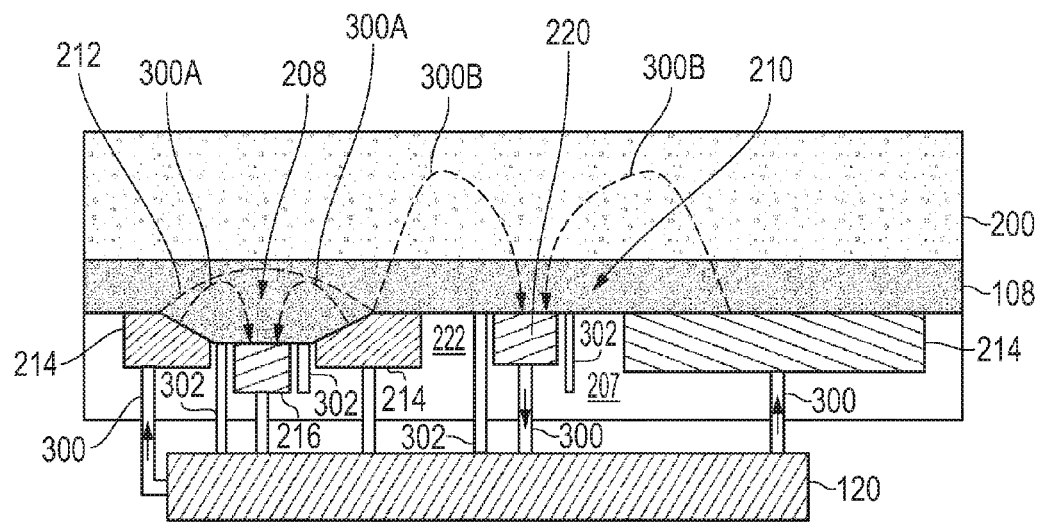
FIG. 3 is a detailed view of the pad of FIG. 2D further depicting the sensor in greater detail during operation.

FIG. 3 depicts a cross-sectional side view of the pad 207 having the fluid sensor 208 and the formation sensor 210 and showing how current flows from the source electrodes 214 to the sensor electrodes, for example the mud button 216 and the formation button 220. A current 300, and/or a voltage, may be applied to any, or all, of the source electrodes 214 by the power source of the electronics package 120. The fluid zone 212 of the fluid sensor 208 may be configured to pass a majority of the current 300A through the wellbore fluid 108. The term "majority" as used herein in reference to current passing to and from the pad 207 refers to more than 50%, but not 100%, of the current passing through the wellbore fluid 108. In some implementations, the current passing to and from the pad 207 can be about 60-99.7%, preferably about 70-99.8%, and more preferably about 80-99.9%, of the current passing through the wellbore fluid 108.

The formation sensor 210 may be configured to pass the current 300B through both the wellbore fluid 108 and the downhole formation 200. Thus, the current 300A may be used to calculate wellbore fluid electrical properties, as described above. The current 300B may be used to calculate the electrical properties of the formation and the wellbore fluid. The currents 300B and 300A may be compared in order to determine the downhole formation 200 parameters without the interference of the wellbore fluid parameters. Thus, from the current 300A detected by the mud button 216 the wellbore fluid parameters may be deduced. The wellbore fluid parameters may then be used to compensate the formation parameters determined from the current 300B such that the formation parameters become independent of the wellbore fluid.

FIG. 3 shows a guard electrode 302 located between the source electrode 214 and the mud button 216, and between the source electrode 214 and the formation button 220. The guard electrode 302 may be located in the insulating material 222. The guard electrodes 302 may be positioned to ensure that only current flowing through the wellbore fluid 108 and the fluid sensor 208 is measured by the mud button 216, and that only current flowing through the wellbore fluid 108, the formation 200, and the formation sensor 210 are measured by the formation button 220. Thus, the guard electrode 302 may prevent parasitic currents from contaminating the measured current and/or voltage.

Figure 4:
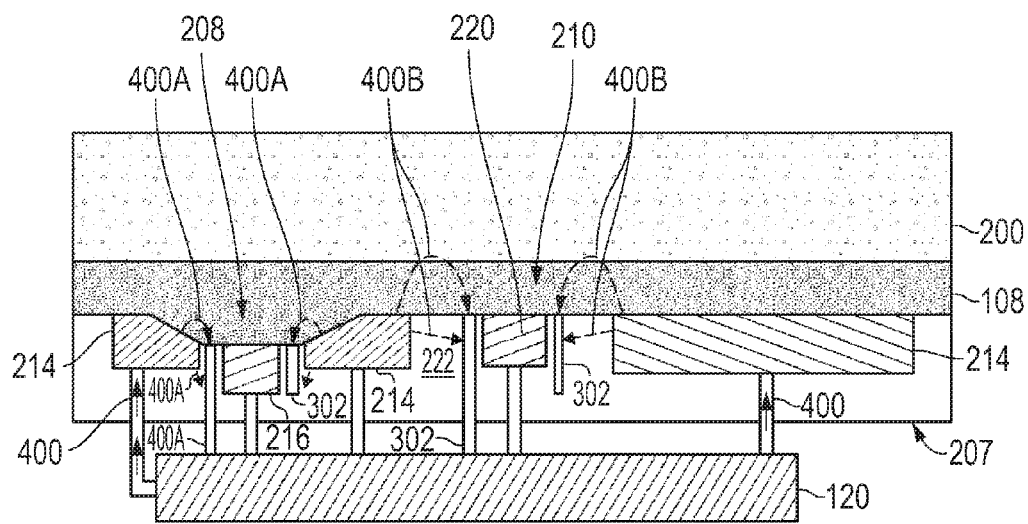
FIG. 4 is an alternate view of the pad of FIG. 3 depicting leakage prevention during operation.

The guard electrodes 302 may be used to intercept leakage currents by applying the three-terminal guarded measurement principle. FIG. 4 depicts a cross-sectional side view of the pad 207 having the fluid sensor 208 and the formation sensor 210. This figure shows how leakage currents that flow (or leak) from the source electrodes 214 are intercepted by the guard electrodes 302. A current 400, and/or a voltage, may be applied to any, or all, of the source electrodes 214 by the power source of the electronics package 120. A certain amount of the current may leak from the source electrode 214 toward the mud button 216 and/or the formation button 220. When the current leaks, the current does not travel through the intended media to be measured, for example the wellbore fluid and/or the formation. Thus, if the current leakage were detected by the sensor electrodes, the wellbore parameters and/or the formation parameters may be compromised by the current leakage. Thus, the guard electrodes 302 prevent the sensor electrodes from detecting one or more leak currents 400A and 400B.

The guard electrode 302 for the mud button 216 and/or the formation button 220 may be a thin highly conductive layer. The conductive layer may be any suitable conductor including but not limited to a metal layer, a foil, metal plating, a combination thereof and the like. The guard electrode 302 for the mud button 216 and/or the formation button 220 may have the same potential as the mud button 216 and/or the formation button 220.

The leak current 400A may travel through the insulating material 222, or a small, and possibly unrepresentative, portion of the fluid zone 212 before being intercepted by the guard electrode 302. These leak currents 400A may not represent the wellbore fluid parameters that the fluid sensor 208 is measuring. Thus, the guard electrode 302 intercepts the leak currents 400A to prevent contamination of the measurements.

The leak current 400B may travel through the insulating material 222, or a small, and possibly unrepresentative, portion of the downhole formation 200 before being intercepted by the guard electrode 302. These leak currents 400B may not represent the formation parameters that the formation sensor 210 is measuring. Thus, the guard electrode 302 intercepts the leak currents 400B to prevent contamination of the measurements.

Figure 5:
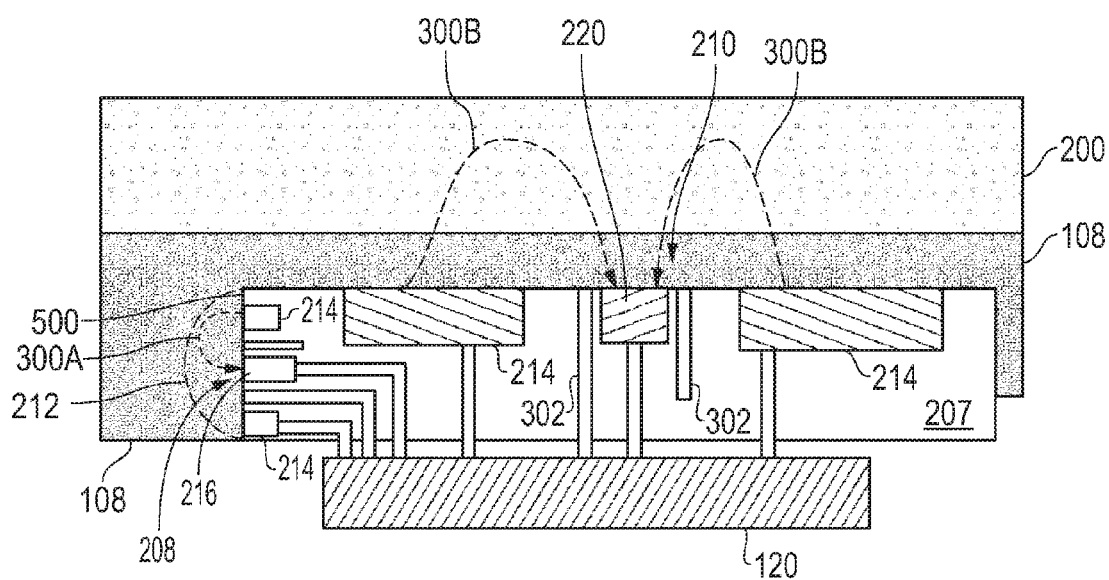
FIG. 5 is a longitudinal cross-sectional view of an alternate pad having a fluid sensor on a side thereof.

FIG. 5 depicts an alternate configuration of the sensor 116 with the fluid sensor 208 located on a side 500 of the pad 207. As shown, the side 500 of the pad 207 is preferably configured to face a direction approximately perpendicular to the formation wall 206. Because the side 500 is not facing the formation wall, the fluid sensor 208 may not need the recess 218, as the current 300A being measured by the mud button 216 may not travel toward the formation wall 206. The fluid sensor 208 may include a fluid zone 212. The fluid zone 212 may be an area configured to allow the fluid sensor 208 to measure the wellbore fluid parameters. For example, the fluid zone 212 may be created by a geometry, or a shape, of the fluid sensor 208 and/or a location of the fluid sensor 208. In this configuration an additional source electrode 214 may be necessary, as the fluid sensor 208 and the formation sensor 210 may be separated from one another. Although the fluid sensor 208 is depicted as being on the side 500 which is normal to the formation wall, it should be appreciated that the fluid sensor 208 may be located on the side 500, or other surface, that is located at a number of angles relative to the formation so long as the current 300A will not travel through the downhole formation 200. Although no recess is shown in the fluid sensor 208, one may be present.

Figure 6A:
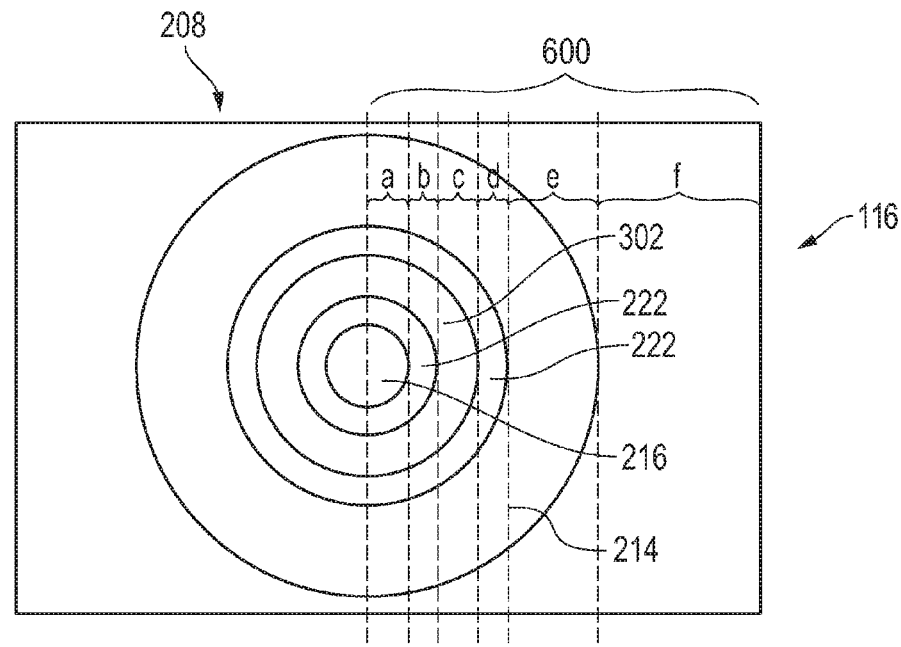
FIGS. 6A-6B are schematic views the fluid sensor of FIG. 2D depicting a configuration thereof.
Figure 6B:
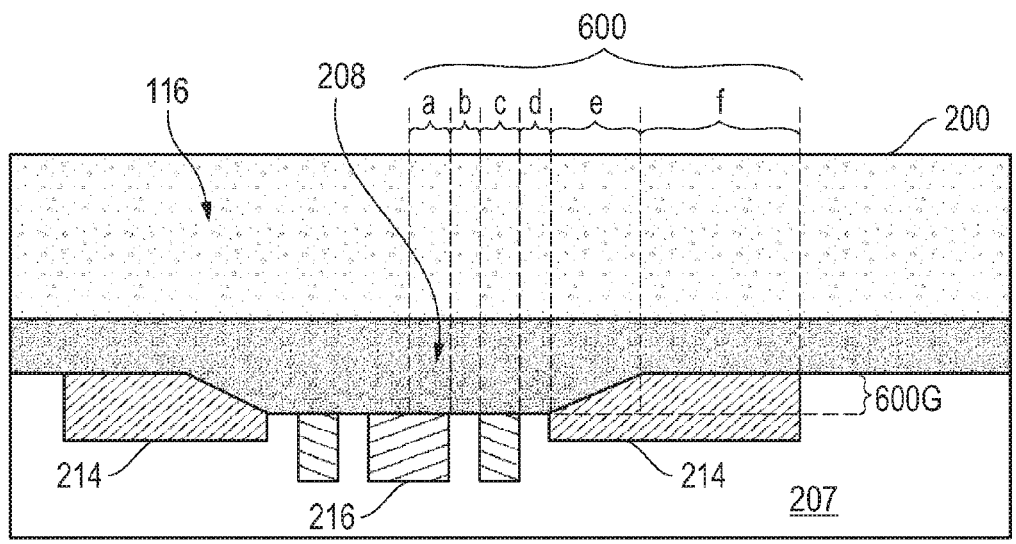

FIGS. 6A and 6B depict an example geometry for the fluid sensor 208. As shown, the mud button 216 is substantially round when viewing from the top as shown in FIG. 6A. A dimension 600A-G is provided as an example of one configuration of the fluid sensor. A mud button radius 600A may be from about 0.5 mm to about 4 mm. A mud button insulator radial width 600B may be from about 0.1 mm to about 1 mm. A guard electrode radial width 600C may be from about 0.005 mm to about 1 mm. A guard insulator radial width 600D may be from about 0.1 mm to about 1 mm. A return fluid zone radial width 600E may be greater or equal to about 3 mm. The front face return width 600F combined with the return fluid zone radial width 600E may be greater than or equal to about 5 mm. A mud button depth 600G, as shown on FIG. 6B may be from about 2 mm to about 6 mm, if the mud button 216 is on a front face of the pad 207 thereby facing the downhole formation 200. It should be appreciated that the dimensions 600A-G may vary depending on the configuration and use of the fluid sensor 208. Further, although the components of the fluid sensor 208 are shown as being circular in FIG. 6A, it should be appreciated that the components may have any suitable shape including, but not limited to, elliptical, oval, polygonal, linear, and the like. For example, the mud button 216 may be a thin and long strip within the fluid sensor 208.

Figure 7:
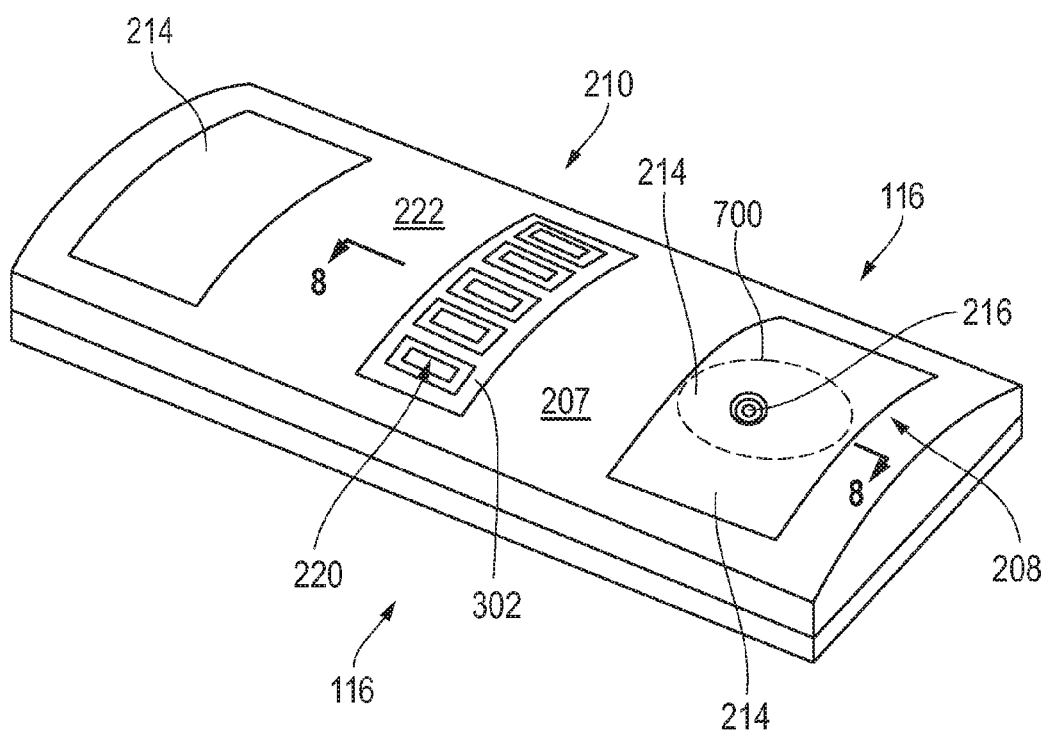
FIG. 7 schematic view of a downhole tool for determining downhole parameters.

FIG. 7 depicts a schematic view of the downhole tool with the sensor 116 thereon. As shown, the fluid sensor 208 includes the mud button 216 in an elliptical recess 700. The fluid sensor 208 as shown may include any of the components described above associated with the fluid sensor 208 including, but not limited to, the source electrode 214, the mud button 216, the guard electrode 302, an insulating material 222, and the like. The elliptical recess 700 may allow the fluid sensor 208 to measure only the wellbore fluid while the downhole tool 104 is in the wellbore 106, as shown in FIG. 1. The formation sensor 210, as shown, includes the formation button 220, the source electrodes 214, the guard electrodes 302 and insulating material 222. The formation button 220 is on the outer surface of the pad 207 and is thereby configured to be proximate the formation wall in operation. As shown, the formation button 220 is a plurality of formation buttons 220 surrounded by a guard electrode 302.

Figure 8:
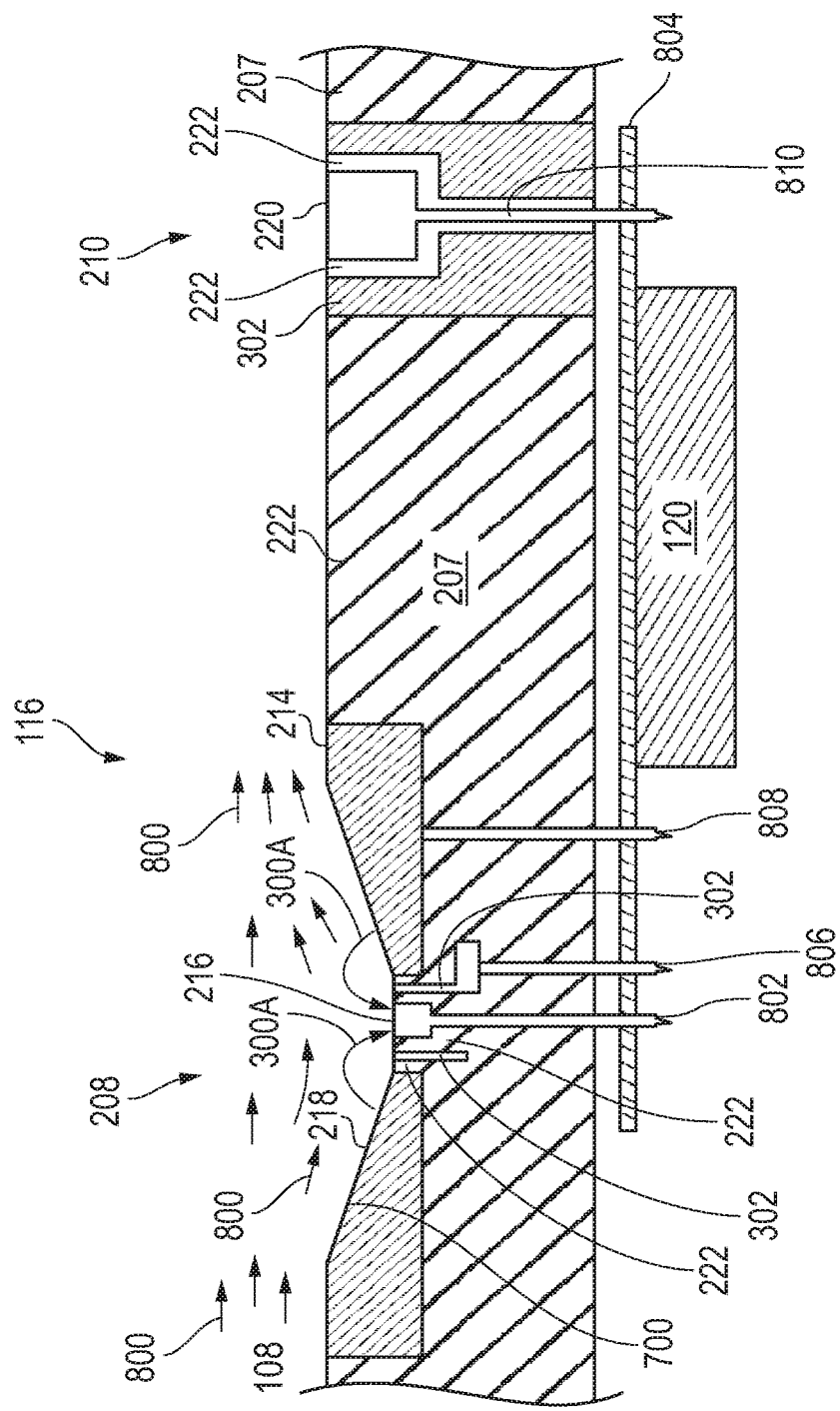
FIG. 8 is a longitudinal cross-sectional view of the downhole tool of FIG. 7 taken along line 8-8.

FIG. 8 depict a cross-sectional view of a portion of the downhole tool 104 of FIG. 7 taken along line 8-8. This shows the mud button 216 centrally located in the return, or source electrode 214. The mud button is at the bottom of the recess 218. The recess 218 is shown as having a gradual slope which may allow a fluid flow 800 of the wellbore fluid 108 proximate the mud button 216. Further, the recess 218 may allow the current 300A to flow only through the wellbore fluid 108 before entering the mud button 216. The mud button 216, as shown, includes a mud button conductor 802 and a guard electrode conductor 806 which may be operatively coupled to one or more communication links 804. The communication links 804 may operatively couple the sensor 116 to the electronics package 120. The source electrodes 214 and the formation button 220 may have a source electrode conductor 808 and a formation button conductor 810 which may operatively couple the source electrode 214 and the formation button 220 to the communication links 804. The mud button conductor 802, the guard electrode conductor 806, and the source electrode conductor 808 may also secure the mud button 216, the source electrode 214 and the formation button 220 to the pad 207.

Figure 9:
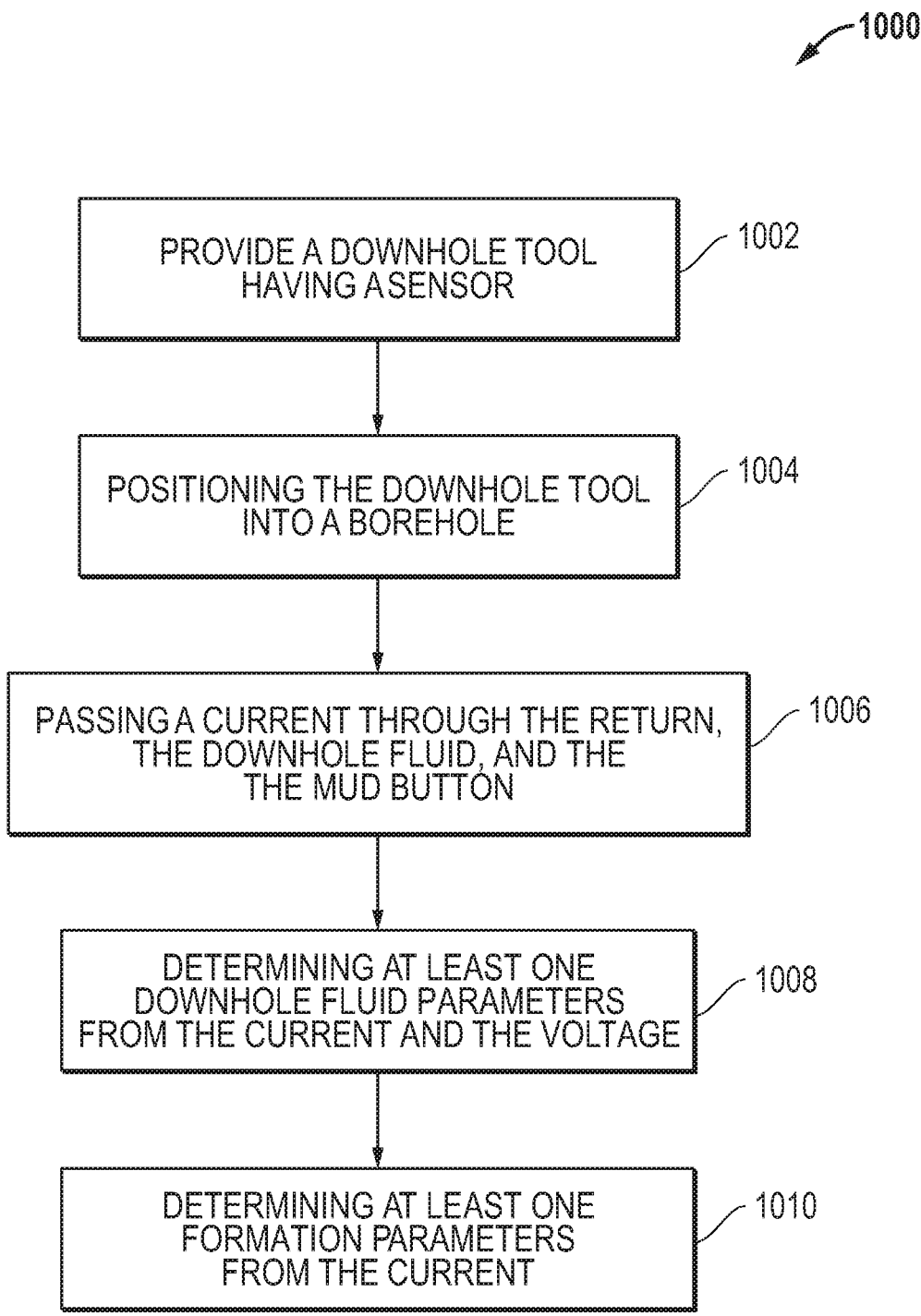
FIG. 9 is a flow chart depicting a method of determining downhole parameters.

FIG. 9 depicts a flow diagram 1000 illustrating the use of the sensor 116. The flow begins by providing 1002 a downhole tool having a sensor. The sensor may have a fluid sensor and a formation sensor. The fluid sensor may be geometrically designed to pass a current and/or a voltage through the wellbore fluid to a mud button in a fluid zone without passing the current and/or the voltage through the formation. The downhole tool may then be positioned 1004 into the wellbore. The downhole tool may then locate the sensor proximate to one of the one or more downhole formations. The sensor may then pass 1006 a current through the return, the downhole fluid, and the mud button. At least one wellbore fluid parameter may then be determined 1008 from the current. Optionally, the sensor may then pass a current through the return, the downhole fluid, the formation, and the formation button. At least one formation parameter may then be determined 1012 from the current. The determined formation parameters and/or wellbore fluid parameters may then be used to enhance wellbore operations about the wellsite.

While the embodiments are described with reference to various implementations and exploitations, it will be understood that these embodiments are illustrative and that the scope of the inventive subject matter is not limited to them. Many variations, modifications, additions and improvements are possible. For example, additional sources and/or receivers may be located about the wellbore to perform seismic operations.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A downhole tool deployable into a borehole of a downhole formation, the borehole having downhole fluid, wherein the downhole tool comprises a sensor for determining at least one downhole parameter of the wellsite, the sensor comprising:

a pad comprising insulation;

at least one return positionable in the insulation, the at least one return adapted to exchange a current with a power source, wherein the at least one return comprises a first portion and a second portion;

a fluid zone comprising the first portion of the at least one return and a mud button positionable in the insulation a distance from the at least one return, the mud button exchanging current with the first portion of the at least one return; wherein the fluid zone comprises a recess, and wherein the mud button is positioned in the recess;

at least one guard for limiting at least a portion of the current flowing between the mud button and one of the at least one returns through the pad, each of the at least one guards positionable between the mud button and one of the at least one returns; and a formation button positionable in the insulation, the formation button exchanging current with the second portion of the at least one return, wherein the formation button is positioned on an outer surface of the pad such that the current passing between the at least one return and the formation button passes through the downhole fluid and the downhole formation, and wherein the mud button is closer to a longitudinal axis of the downhole tool compared to the formation button; and wherein the mud button and the fluid zone are positioned such that a majority of the current passing between the first portion of the at least one return and the mud button passes through the downhole fluid whereby the current exchanged with the mud button generates a measurement of the downhole fluid.

2. The downhole tool of claim 1, wherein the recess has a circular periphery.

3. The downhole tool of claim 1, wherein the recess has an elliptical periphery.

* * * * *